United States Patent [19]

Eschbach

[11] Patent Number: 5,414,538
[45] Date of Patent: May 9, 1995

[54] IMAGE-DEPENDENT EXPOSURE ENHANCEMENT

[75] Inventor: Reiner Eschbach, Webster, N.Y.
[73] Assignee: Xerox Corporation, Stamford, Conn.
[21] Appl. No.: 132,973
[22] Filed: Oct. 7, 1993
[51] Int. Cl.⁶ ............................................. H04N 1/46
[52] U.S. Cl. ..................................... 358/522; 358/520
[58] Field of Search ............... 358/500, 515, 518, 520, 358/521, 522, 523, 466; H04N 1/46; 346/157; 382/18, 51; 348/603, 687, 672

[56] References Cited

U.S. PATENT DOCUMENTS

| | | | |
|---|---|---|---|
| 4,908,701 | 3/1990 | Udagawa | 358/520 |
| 5,187,570 | 2/1993 | Hiber et al. | 358/520 |
| 5,237,402 | 8/1993 | Deshon et al. | 358/520 |
| 5,347,374 | 9/1994 | Fuss et al. | 358/520 |

OTHER PUBLICATIONS

R. C. Gonzales and B. A. Fittes, "Gray level transformation for interactive image enhancement," Proc. Second Conference on Remotely Manned Systems, 1975.
E. L. Hall, "Almost uniform distributions for computer image enhancement," IEEE Trans. Comput. C-23, 207–208, 1974.
W. K. Pratt, *Digital Image Processing*, Wiley, New York, 1978.
M. P. Ekstrom, *Digital Image Processing Techniques*, Academic Press, Orlando, 1984 (J. S. Lim).
J. C. Russ, *The Image Processing Handbook*, CRC Press Boca Raton, 1992.
R. C. Gonzalez and P. Wintz, "Image Enhancement by Histogram Modification Techniques", *Digital Image Processing*, Addison–Wesley Publishing, 1977, p. 118 et seq.
Pizer et al. "Adaptive Histogram Equalization and its Variations", Computer Vision, Graphics, and Image Processing, 39, 355–368 (1987), pp. 355–369.
"Xerox Color Encoding Standard," XNSS 289005, 1989.

*Primary Examiner*—Edward L. Coles, Sr.
*Assistant Examiner*—Kim Yen Vu
*Attorney, Agent, or Firm*—Mark Costello

[57] ABSTRACT

A method of altering the exposure in the reproduction of an electronically encoded natural scene image, including process steps of a) receiving an electronically encoded natural scene image, where the encoding is in terms of red-green-blue signals; b) converting the signals to a luminance-chrominance signal format, wherein at least one signal represents overall image intensity; c) comparing the intensity signal to a pair of preset threshold signals $T_{light}$, $T_{dark}$, respectively indicating satisfactory brightness and darkness of the image and producing a multi-state signal responsive to the comparison; d) if the signal state indicates that both thresholds are exceeded, or that neither threshold is exceeded, directing the electronically encoded image without alteration to further processing; e) if the signal state indicates that one of the pair of preset thresholds is exceeded, the original electronically encoded signal is processed in accordance with the equation:

$$OutputI = InputI^{\gamma}$$

where I is image intensity at a given discrete area of the image and $\gamma$ is given as $$Y = \frac{\ln[(T_{light}, T_{dark})/L]}{\ln[(I_{light}, I_{dark})/L]}$$

27 Claims, 9 Drawing Sheets

IMAGE-DEPENDENT EXPOSURE ENHANCEMENT

The present invention is directed towards a method and apparatus for improving the appearance of a digitally encoded image having a pictorial scene, and more particularly, toward a method for improving exposure within digitally encoded image having a pictorial scene.

CROSS REFERENCE

Cross reference is made to the following co-pending application U.S. Ser. No. 08/131,172, filed Oct. 4, 1992, entitled "Image-Dependent Color Shifting of Strongly Color Shifted Images", by R. Eschback (assigned to the same assignee as the present application).

BACKGROUND OF THE INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality One very common set of input documents includes photographs. Unfortunately, photography is an inexact science, particularly among amateurs, and original photographs are often poor. Alternately, technology, age or image degradation variations often result in pictures having an unsatisfactory and undesirable appearance. What is desired then, is a copy giving the best possible picture, and not a copy of the original.

Photography has long dealt with this issue. Analog filters and illumination variations can improve the appearance of pictures in the analog photographic process. Thus, for example, yellow filters enhance the appearance of white clouds against a blue sky in alack and white images Further, various electrophotographic devices, including digital copiers, can clean up and improve images by adjustment of threshold, filtering, or background suppression. Generally, these methods are manual methods which a user must select on an image by image basis. Unfortunately, the casual user is not skilled enough to perform these operations. The inability to perform image enhancement operations is exacerbated when additionally dealing with color controls.

Three possible choices are presented by the art in the area of image enhancement. In the first case, we can do nothing. Such a system is a stable system, in that it does no harm to an image, but its output documents are sometimes not satisfactory to the ultimate customer. This is a common approach taken to reproduction.

In a second case of image enhancement, the image can always be processed. It turns out than an improvement can usually be made to an image if certain assumptions are made that are accurate for most cases. In an exceptionally large set of images, increasing contrast, sharpness, and/or color saturation, will improve the image. This model tends to produce better images, but the process is unstable, in that for multi-generation copying, increases in contrast, saturation, or sharpness are undesirable and ultimately lead to a severe image degradation. Further the process may undesirably operate on those images which are good ones.

Accordingly, we arrive at our third case of image enhancement, a process of automated image enhancement which operates to vary images which are not perceived as good images, but does not operate on images which do not need to be improved, thereby allowing a stable process.

One improvement that can be made to an image is to correct the image's use of an unbalanced distribution of density over the dynamic range of the image. This process is sometimes characterized as exposure adjustment. Digital input images directed to reproduction systems come from a variety of input sources such as copiers, slide scanners, flat-bed scanners, cameras, etc. In many cases, the description of the image will come from an unknown source, or one that might exhibit certain deficiencies. One common deficiency is that the digital representation of the image has an unbalanced distribution of density over the range of possible values, i.e., only covers a limited range of the possible values. This differs from contrast, which refers to the perception of the dynamic range of the image. Contrast adjustment will change the perceived contrast of the image, however it will only do a limited improvement on images that have exposure levels that are commonly described as "too light" or "too dark". In order to correct these kind of images, exposure and contrast have to be estimated and, when needed, enhanced. A number of contrast adjustments using the image histogram is known in the art. Histogram manipulation for the purpose of enhancing the appearance is described in R. C. Gonzales and B. A. Fittes, "Gray level transformation for interactive image enhancement," Proc. Second Conference on Remotely Manned Systems, 1975; E. L. Hall, "Almost uniform distributions for computer image enhancement," IEEE Trans. Comput. C-23, 207–208, 1974; W. K. Pratt, *Digital Image Processing*, Wiley, New York, 1978; and M. P. Ekstrom, *Digital Image Processing Techniques*, Academic Press, Orlando, 1984; J. C. Russ, *The Image Processing Handbook*, CRC Press Boca Raton, 1992.

Also noted is R. C. Gonzalez and P. Wintz, "Image Enhancement by Histogram Modification Techniques", *Digital Image Processing*, Addison-Wesley Publishing, 1977, p. 118 et seq., describing histogram flattening functions known in the art.

The references cited are herein incorporated by reference.

When images suffer from an unbalanced distribution of density over the dynamic range of the image, they may be characterized as having good contrast, but are either too light or too dark. Taking a dark image as an example, the image could be uniformly lightened in accordance with the function:

$$I' = I + \alpha \qquad (1)$$

but that operation tends to lighten the background, and does not provide a desired improvement.

Alternatively, the dark image could be multiplied by a fixed value, in accordance with the function:

$$I' = \beta I \qquad (2)$$

which would tend to linearly stretch the distribution of density over the dynamic range of the image.

As a third choice, the dark image could be altered in accordance with the function:

$$I' = I^\gamma \quad (3)$$

where $0 \leq I \leq 1$ which tends to non-linearly alter the image.

The references identified are herein incorporated by reference for their teachings.

SUMMARY OF THE INVENTION

In accordance with the invention, there is provided a method of altering the exposure in the reproduction of an electronically encoded natural scene image.

In accordance with one aspect of the invention, there is provided a method of altering the exposure in the reproduction of an electronically encoded natural scene image, including process steps of a) receiving an electronically encoded natural scene image, where the encoding is in terms of red-green-blue signals; b) converting the signals to a luminance-chrominance signal format, wherein at least one signal represents overall image intensity; c) deriving from the intensity signal a measurement indicative of the bright input intensity signal $I_{light}$ and the dark input intensity signal $I_{dark}$; d) comparing the light and dark intensity signal to a pair of preset threshold signals $T_{light}$, $T_{dark}$, respectively indicating satisfactory brightness and darkness of the image and producing a four state signal responsive to the comparison; d) if the signal state indicates that both thresholds are exceeded, or that neither threshold is exceeded, directing the electronically encoded image without alteration to further processing; e) if the signal state indicates that one of the pair of preset thresholds is exceeded, the original electronically encoded signal is processed in accordance with the equation:

$$I_{Out} = I_{In}^\gamma \quad (4)$$

where $I_{In}$ is the input image intensity at a given discrete area of the image, $I_{Out}$ is the output image intensity at same location. $\gamma$ is determined using $$Y = \frac{\ln[T_{light}/C]}{\ln[I_{light}/C]}, \quad (5)$$

for dark images and $$Y = \frac{\ln[T_{dark}/C]}{\ln[I_{dark}/C]}, \quad (6)$$

for light images. Here, the constant C is used for renormalization, with C=1 if $0 \leq I_{in} \leq 1$ and C=255 if $0 \leq I_{in} \leq 255$.

In accordance with another aspect of the invention, $\gamma$ is evaluated for data where $C_{light}$, $I_{dark}$) is set at 100% of the values, and where ($I_{light}$, $I_{dark}$) is set at 95% of the values, and the result is conditionally averaged. Optionally, distinct thresholds are provided for each evaluation.

In accordance with another aspect of the invention, the modification of exposure as estimated from the input image intensity is applied to each separation in the electronically encoded natural scene image, where the encoding is in terms of red-green-blue signals.

The invention is operative to determine whether there is too much data in either the dark regions or the bright regions. If the image has this characteristic, a value for $\gamma$ is calculated to balance the histogram or data distribution into one region. For $\gamma > 1$, data is stretched towards lower intensities, while for $\gamma < 1$, data is stretched towards higher intensities. The described inventive process teaches an approach to exposure control that in a preferred embodiment is accompanied by an additional contrast adjustment process.

These and other aspects of the invention will become apparent from the following descriptions used to illustrate the preferred embodiment of the invention, read in conjunction with the accompanying drawings in which.

Figure 4:
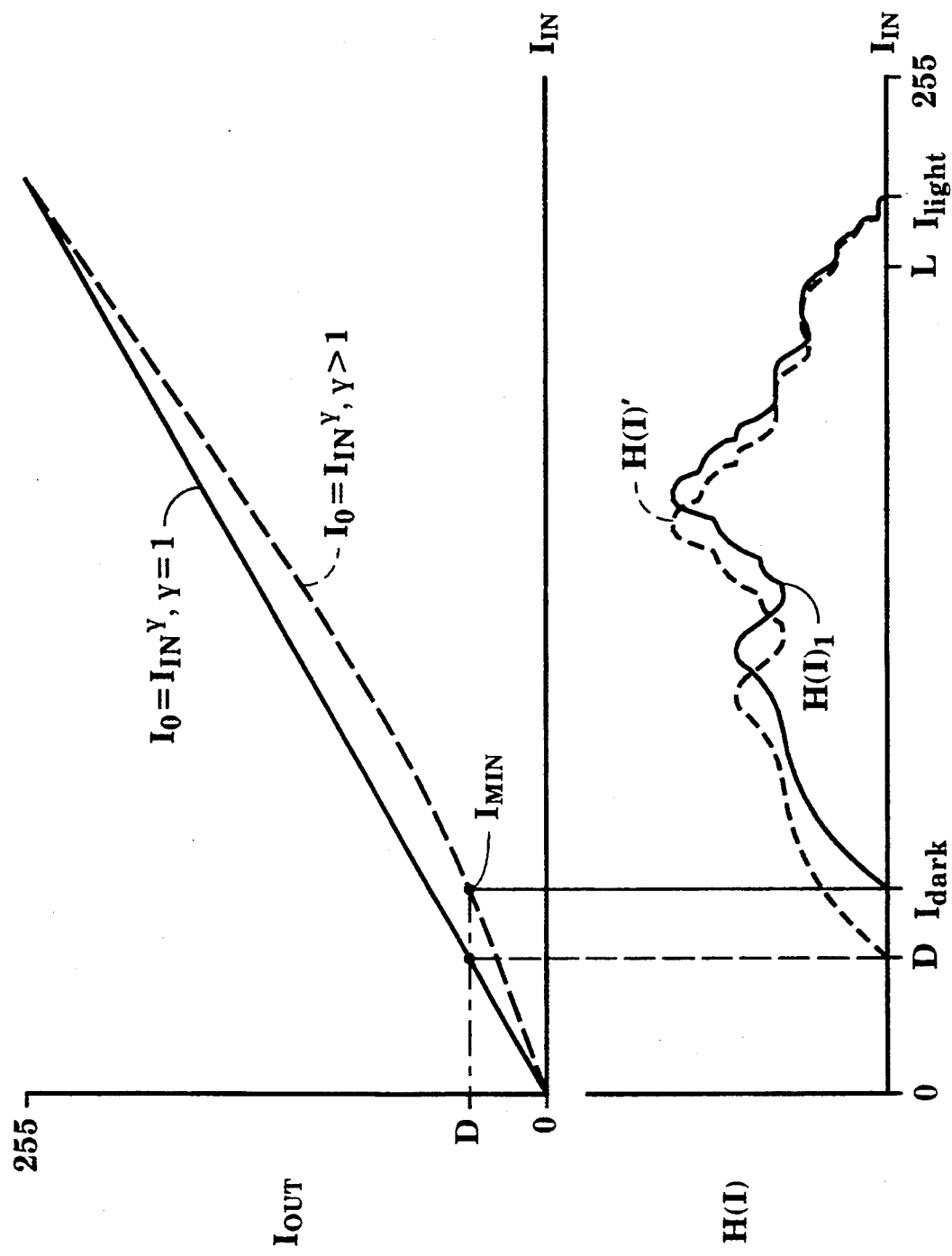
Figure 5:
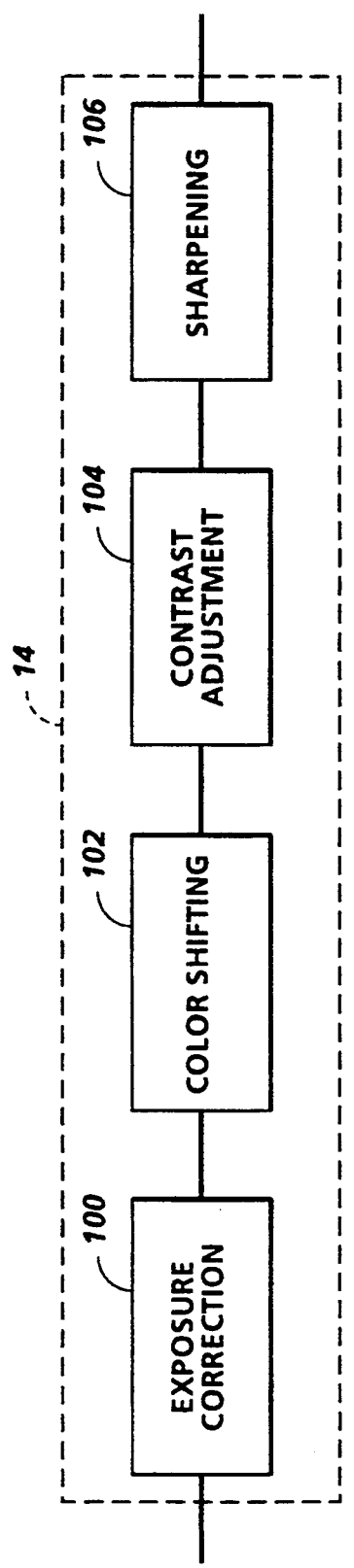
Figure 6:
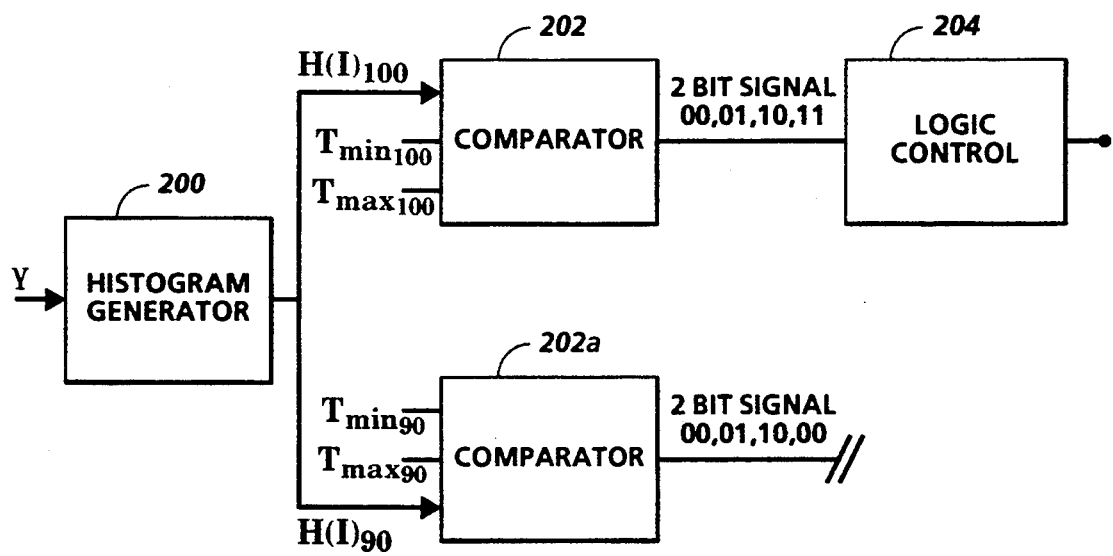
Figure 7:
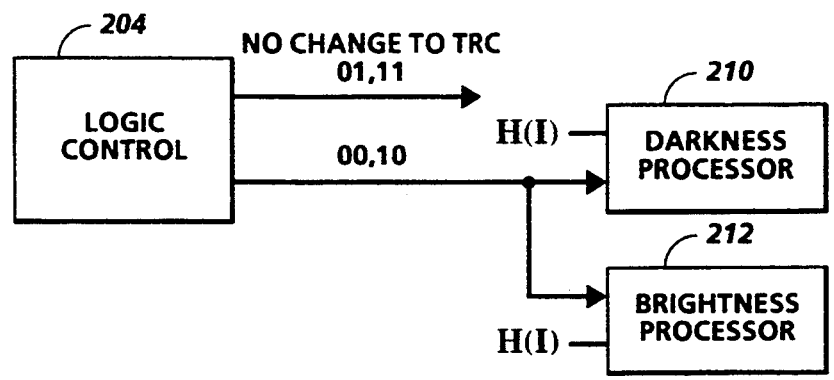
Figure 8:
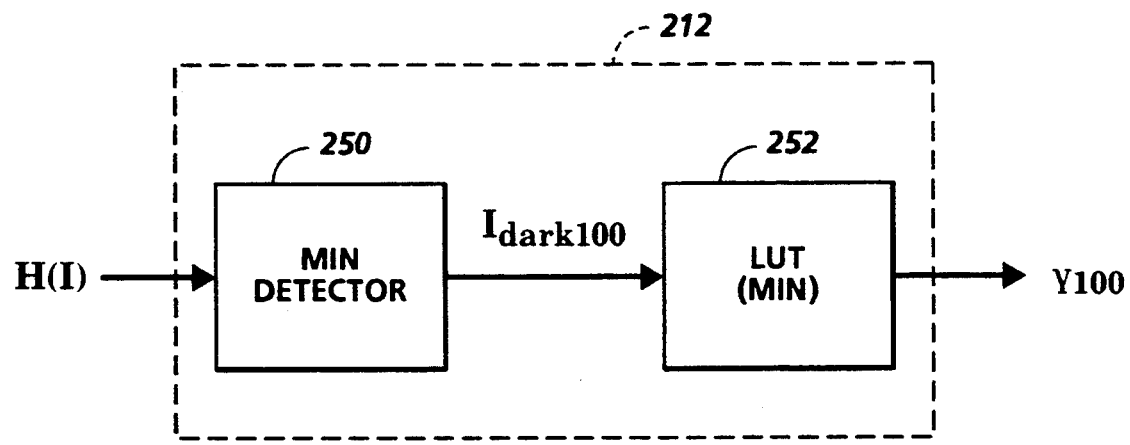
Figure 9:
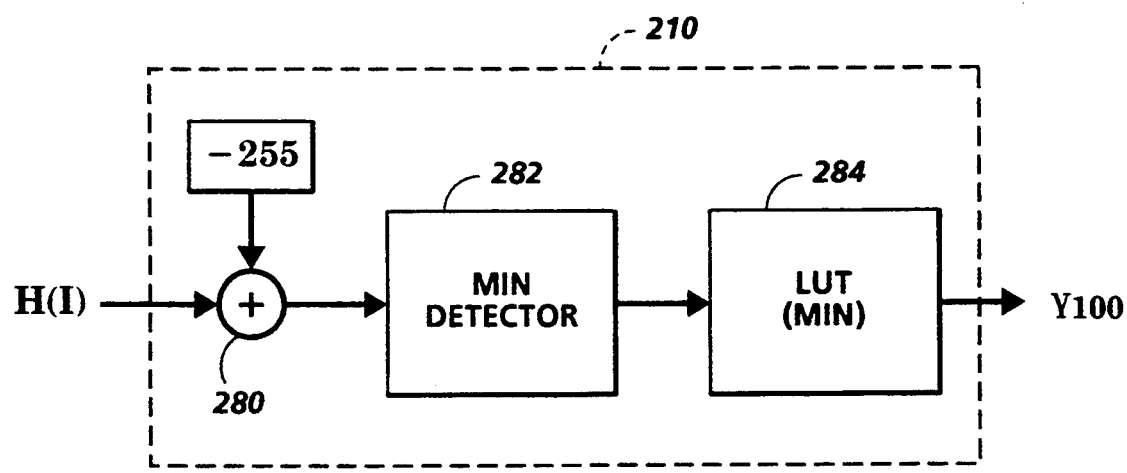
Figure 10:
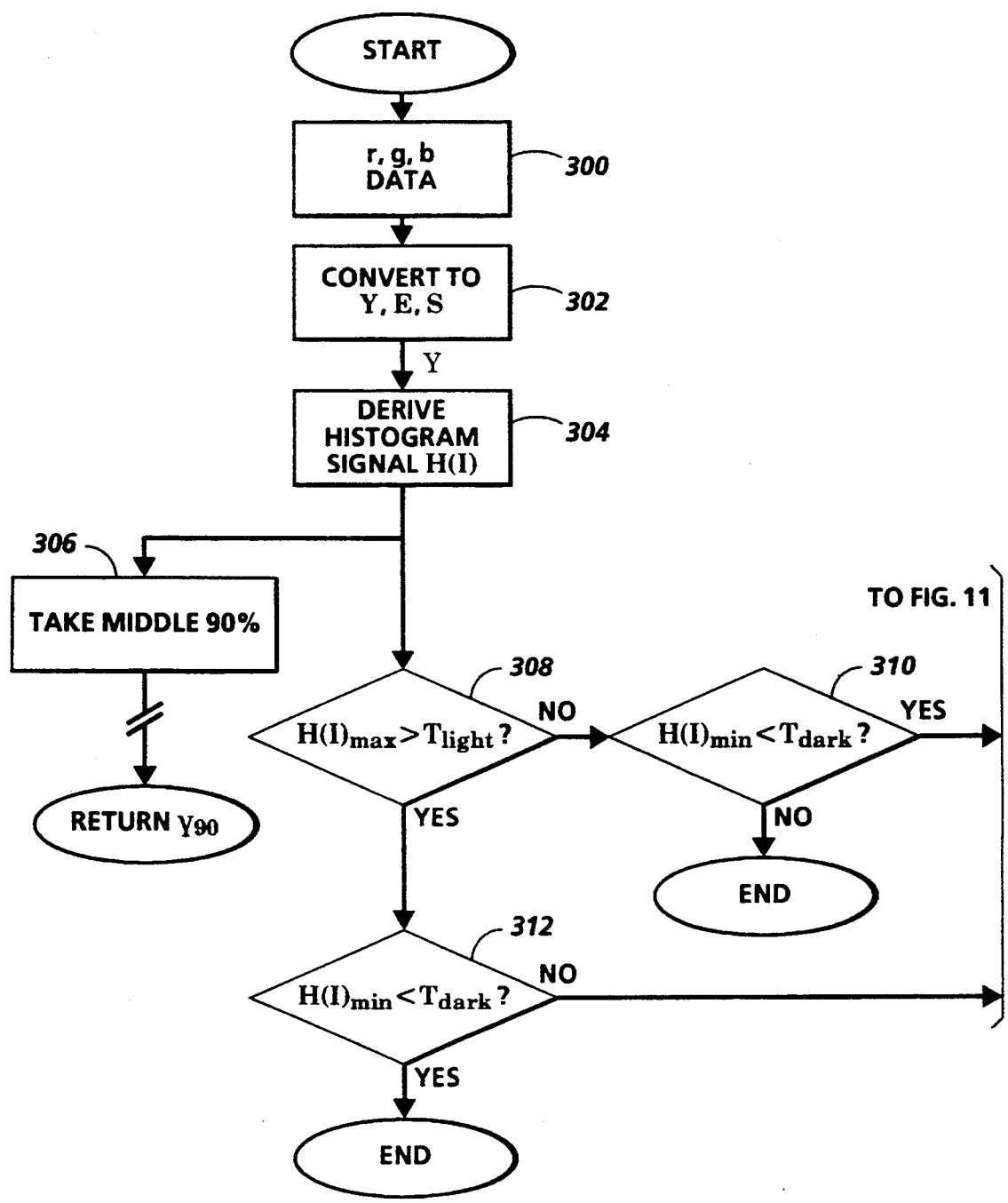
Figure 11:
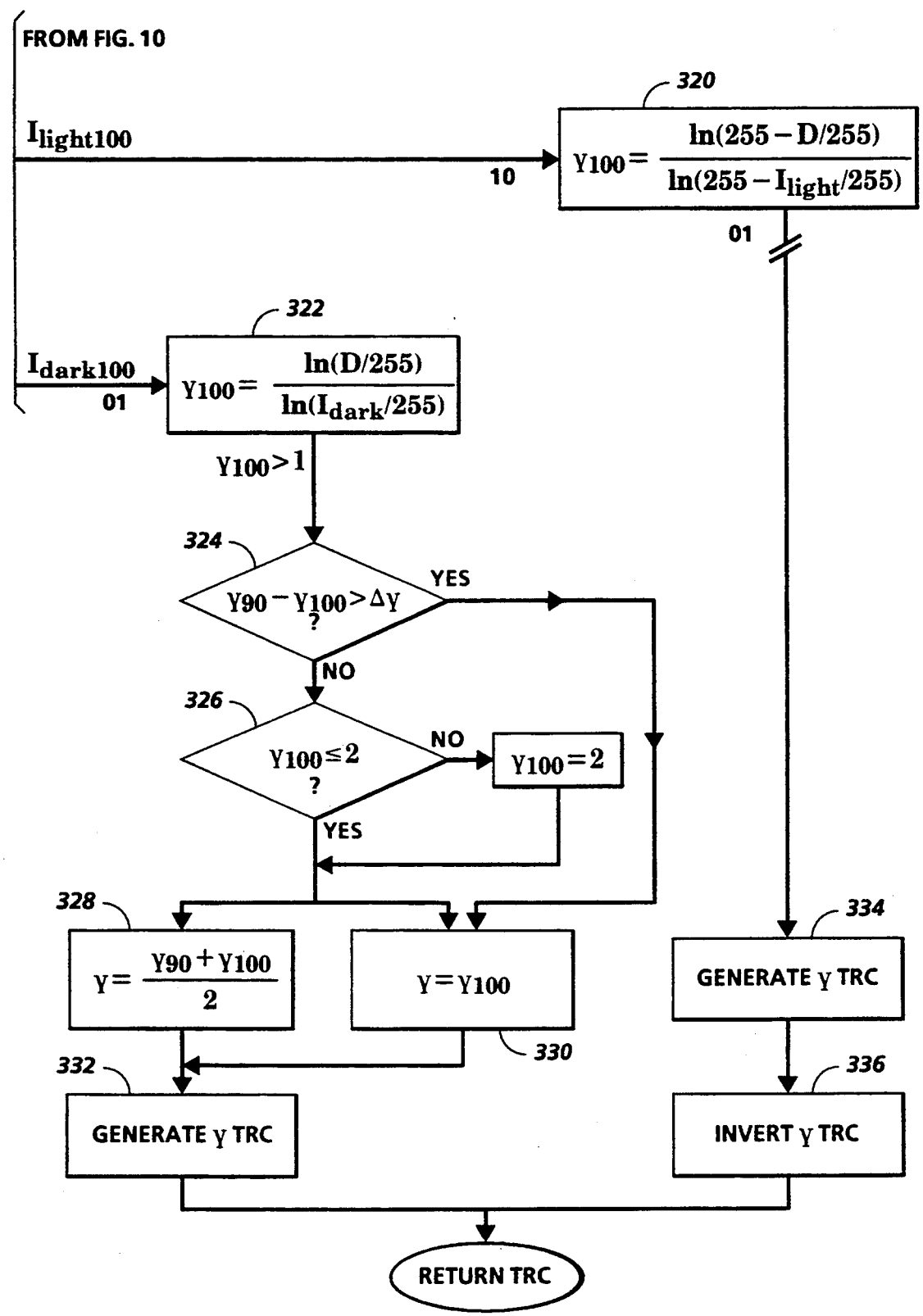

FIG. 4 the principle of operation of the present invention;

FIG. 5 shows an automated color image enhancement system in which the present invention finds use;

FIG. 6 shows a block diagram of the exposure enhancement logic signal generator;

FIG. 7 shows a block diagram illustrating a controller for the darkness and lightness processors;

FIG. 8 shows a block diagram of the gamma generator for the lightness processor;

FIG. 9 shows a block diagram of the gamma generator for the darkness processor; and FIGS. 10 and 11 together illustrate a flow diagram showing the inventive process.

DETAILED DESCRIPTION OF THE INVENTION

Figure 1:
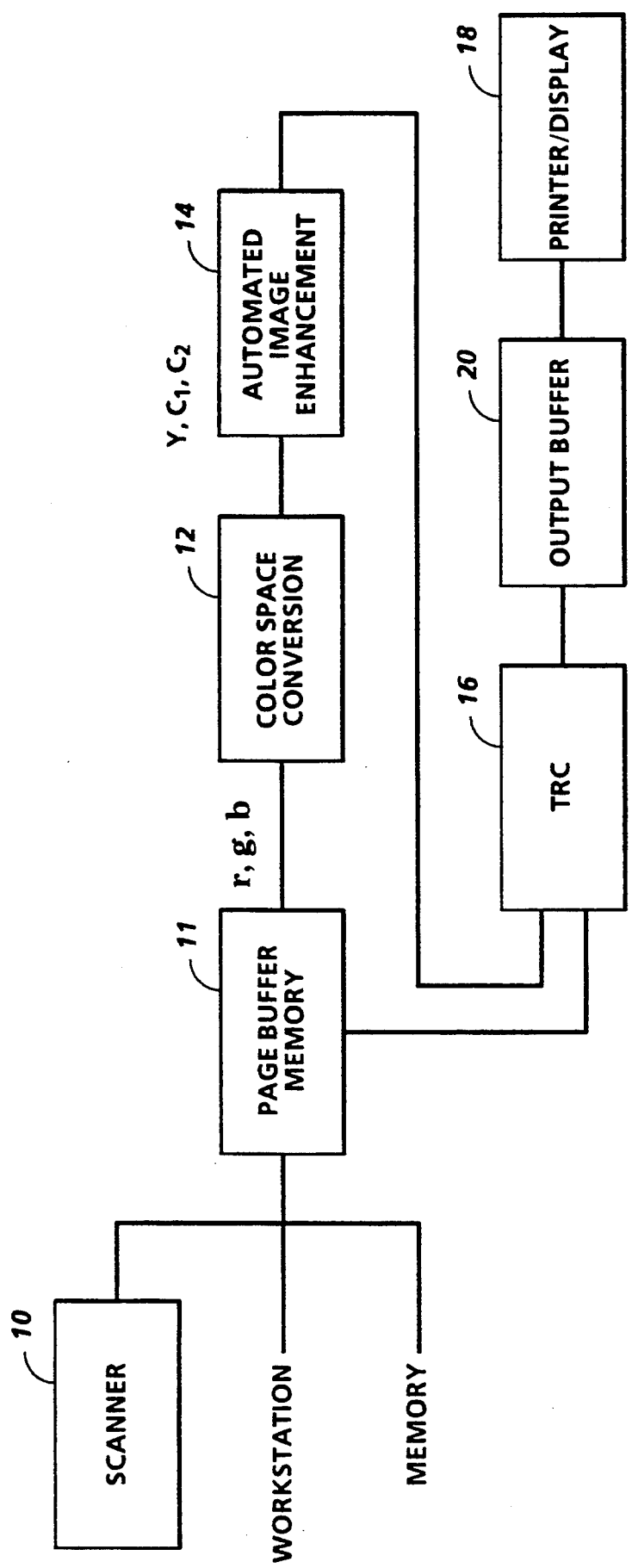
FIG. 1 shows a functional block diagram of a system employing the present invention.

Referring now to the drawings where the showings are for the purpose of describing the embodiment of the invention and not for limiting same, reference is made to FIG. 1 scan-to-print system in which the present invention may find advantageous use.

FIG. 1 illustrates a scanner 10 which may conveniently be a black and white or color scanner which produces image signals defined in either RGB space for color images or density space for black and white images. These images of concern are pictorial in nature, i.e., they represent natural scenes. While certain computer generated imagery may qualify as representing nature scenes, the class of images contemplated are predominantly scanned photographs. The images themselves are defined in terms of pixels, wherein each pixel is an electrical or electronic signal with a digital gray value which varies between a white level (in the example system, a maximum) and a black level (in the example system, a minimum). In a currently desirable system, in which calculations may be done on 8 bits of information, 256 levels of gray will be available for use. Pixels are also identified in terms of position, i.e, a pixel defines a unique area within the image, identified by its position in a scan line, and the scan line position in a page. Color is therefore represented by triplets of gray pixels for each color pixel in the image, each triplet of gray pixel defining the color in each separation, which together form the color pixel.

The output of a scanner 10 may be directed to an automated image enhancement system which will be further defined herein. For our purposes, the automated image enhancement system may include a segmentation system which can identify within a document a type of image, and if desired a descreening system, as the present invention is operative on continuous tone natural scene images. It will be assumed that the output of the automated image enhancement system that is described herein will ultimately be directed to a printer, CRT, or like device. These devices may have many characteristics and may be laser printers, or ink jet printers or LED displays or CRT displays. However, they have as a common requirement the representation of gray pictorial images. This may be done with gray printing or pseudo gray printing.

In terms of deriving data for operation by the present image enhancement system, a prescan may be performed on a document placed on a copying platen and scanned by the electro-optical system of the scanner to produce a signal representing the document image. Alternatively, the image may be directed to the automated image enhancement system from a memory, having previously been scanned or derived some other system, in which case, the received image is sampled as required.

The prescan may be performed in an undersampled fashion, i.e., the image need not be sampled at the ultimate resolution of the system for the purposes of enhancement. In practice, it has been determined that a relatively small number of pixels representative of and dispersed through the entire image can accurately represent the image for this purpose. In our particular embodiment, we use a block of pixels derived from the image in approximately 512 pixels×512 pixels. The primary purpose of this selection is to improve the speed at which a software image enhancement system can process the pictorial images. Sampling at common image resolutions does not improve the results noted in the inventive process herein described significantly, and dramatically increases the software processing time required. Hardware embodiments of the described inventive process might be designed not to undersample the image.

Generally, the system in which the present invention finds use can be represented as in FIG. 1, wherein natural scene images defined in terms of RGB space are initially directed to a color space converter 12, which converts RGB signals to a selected color space for enhancement processing, as will become apparent. Conveniently, intermediate storage of the image in the form of page buffer memory 11 may be provided, although the correction values to be described and calculated hereinafter may also be calculated in a prescanning process which does not require a page of buffering. The output of color space converter 12 is processed by the automated image enhancement device 14 as will be described in more detail, which produces a signal which drives the TRC (tone reproduction curve) controller 16 of an output device such as printer 18. TRC controller 16 transmits the processed data to an optional output buffer 20, for subsequent transfer to printer 18 or other output device. The implementation of the present invention alters the TRC, on an image by image basis, as will be more completely described hereinafter. It will be clear that the TRC controller 16 might work separately or integrally with a TRC controller that is commonly used to adjust the device independent data stream to the device dependent data used for printing or display.

Figure 2:
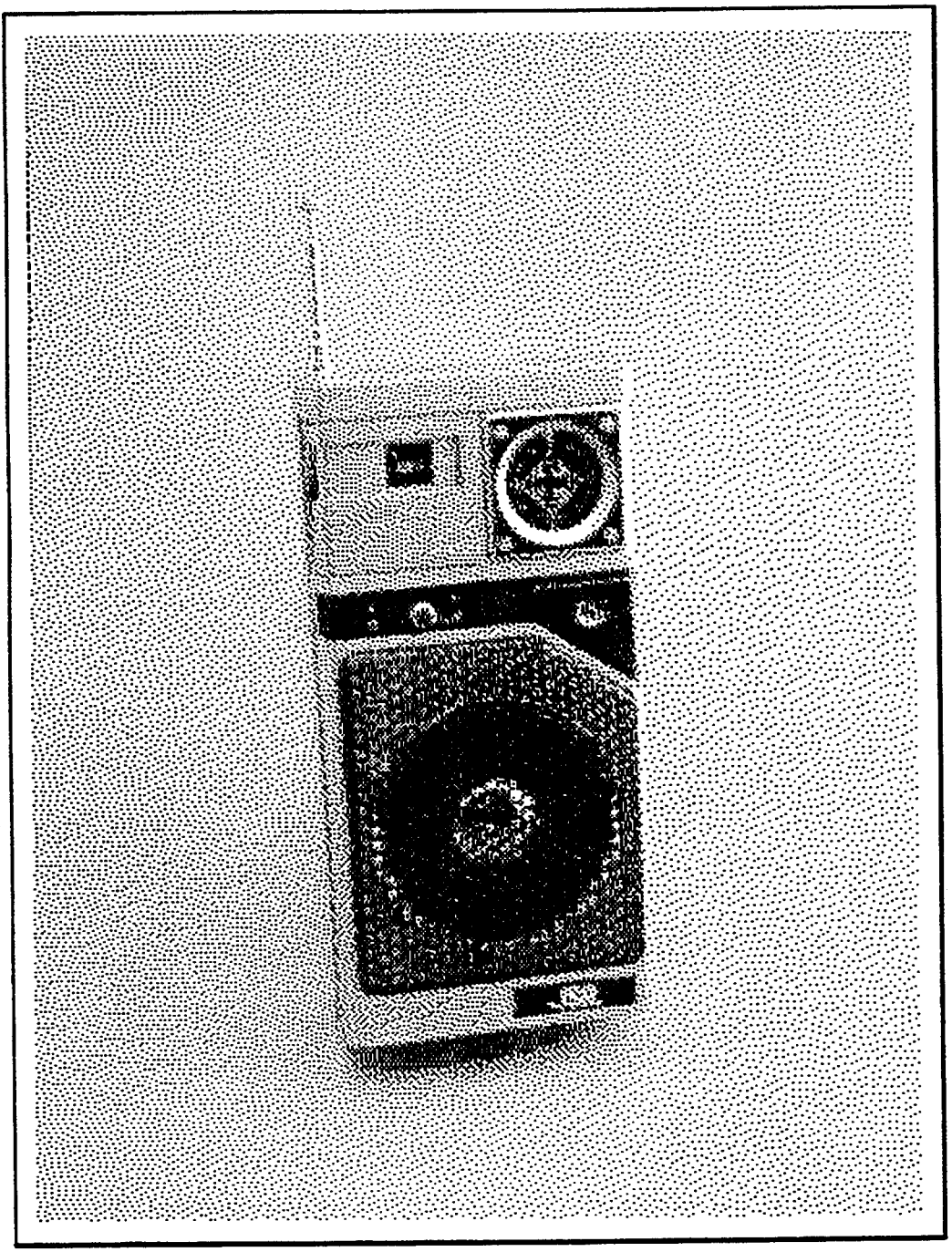
FIG. 2 shows in a pseudo gray format a gray image example fro processing.
Figure 3:
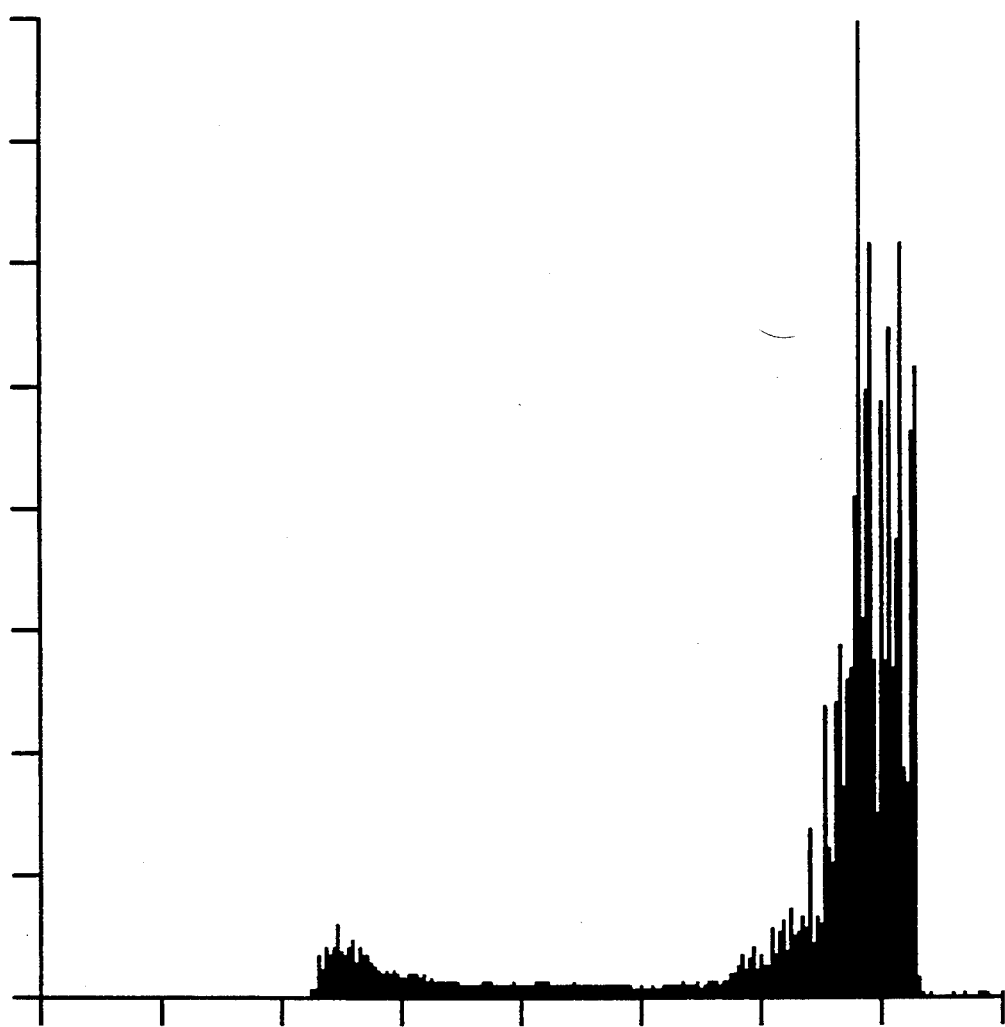
FIG. 3 shows a histogram of the actual gray image of FIG. 2.

Now, the principle of the present invention will be described before describing an implementation thereof. With reference now to the gray picture or image in FIG. 2, which for purposes of reproduction is shown here, in pseudo gray (halftoned binary) rather than real gray, the histogram function H(I) of the actual gray picture shown in FIG. 3 is a map of populations of pixels at each input intensity level possible in the FIG. 2 picture. If operating in a multi-bit space, such as 8-bit space, we will find that the luminance levels will be distributed between 0 and 255. The particular picture is too light, as shown by the fact that there are no pixel populations in the lower density levels. At FIG. 4, the system transfer function is shown, mapping input signal $I_{in}$ representing overall input image intensity to output $I_{out}$ which represents intensity as printed or displayed. In the illustration, shown, decreasing I represents darkness in the image, or pixels at relatively high densities, while increasing I represents brightness in the image or pixels at relatively low densities. The relationship of $I_{in}$ to $I_{out}$ can be described as $$I_{out}=I_{in}{}^{\gamma} \quad (7)$$

For a linear system the relationship is given as $$I_{out}=I_{in} \quad (8)$$

and therefore $$\gamma=1 \quad (9)$$

The function H(I) represents the histogram of the image (or an image portion), and provides an indication of the number of pixels at each level of I or intensity of the image. The function in this case ranges between $I_{min}$ and $I_{max}$.

Given a reference value $T_{dark}=D$ on the $I_{in}$, where $T_{dark}$ represents a level of darkness that well exposed images usually include, the difference between $T_{dark}$ and $I_{dark}$ represents a desirable change in the exponent $\gamma$. A new curve relating $I_{in}$ to $I_{out}$ can therefore be defined as:

$$I_{out}=I_{in}{}^{\gamma} \quad (10)$$

where $$Y = \frac{\ln[D/255]}{\ln[I_{dark}/255]}, \quad (11)$$

The value 255 will vary with the number of gray levels within the system, and is alternatively represented by the number of gray levels.

The process can work substantially the same for images which do not have enough of a level of brightness that well exposed images usually include, by using the light threshold L, and the measured light intensity $I_{light}$. In FIG. 4 the simple relationship $I_{dark}=I_{min}$ and $I_{light}=I_{max}$ was used for simplicity of illustration.

Now looking at each process function of the implemented automated image enhancement device and with reference now to FIG. 1, for the first step, the initial color image data initially received from scanner 10 or the like, is assumed to be in RGB space initially, i.e., red-green-blue space, and for the inventive process, must initially be converted at color space converter 12 to luminance space ($YC_1C_2$). It is possible that the image will already be in luminance space, as it is common to convert RGB values to luminance/chrominance space for other image processing. While $YC_1C_2$ space is a useful space in which the inventive process can be performed, also useful is any set of color coordinates to an expression where one term has a relationship to overall image intensity or density such as Y of Xerox YES of the "Xerox Color Encoding Standard," XNSS 289005, 1989. Whatever space is used must have a component which relates to the human visual perception of lightness or darkness. In the following example, the invention will be described using the Xerox YES color space. Experience suggests that color space conversion may be required for several functions in the overall system, and accordingly, in FIG. 1 it is shown independently of automated image enhancement. It should be noted that in some embodiments it would be sufficient to transform the RGB color data to pure intensity data for automated exposure control, ignoring the chrominance signal if the determined correction is applied to the RGB channels. In another embodiment, the determined correction is applied to the Y-component of $YC_1C_2$ data, in which case the chrominance signal has to be maintained. In FIG. 5, automated image enhancement is more specifically depicted as a plurality of functions of which exposure correction 100 is the first in serial order. Following this function in no particular order is color shifting 102, contrast adjustment 104, and image sharpening 106. Experience appears to suggest that while global exposure correction could occur in any order in image enhancement processing, it preferably occurs first.

With reference now to FIG. 6, at histogram signal generator 200 histogram signal H(I) is generated from Y. At this point, the signal path becomes branched so that $\gamma$ can be evaluated in two different ranges within the picture, as will be explained later. At comparator 202, signal $I_{dark}$ is compared to $T_{dark}$ and $I_{light}$ is compared to $T_{light}$, using 100% of the entire range of H(I) for $I_{dark100}$ and $I_{light100}$ and 90% of the entire range of H(I) for $I_{dark90}$ and $I_{light90}$. Four possible cases derive from this comparison for each range, which can be expressed as a 2 bit signal response:

| Response | $I_{light} > T_{light}$ | $I_{dark} < T_{dark}$ | Action | Y |
|---|---|---|---|---|
| 00 | Yes | Yes | No action | 1 |
| 01 | Yes | No | Increase Darkness | >1 |
| 10 | No | Yes | Increase Brightness | <1 |
| 11 | No | No | No action | 1 |

Looking at the possible responses, it can be seen that response 00 indicates that the image is a good one, using the full dynamic range possible. Response 11 indicates that something else is wrong with the image, that is better corrected by another process. Responses 10 and 01 indicate appropriate circumstances for exposure control. Logic control 204 controls the remainder of the process depending on comparator 202 response. In cases 00 and 11, it directs uncorrected signals to the next processing step, or otherwise indicates that the data will not be processed at the exposure correction system. Dependent on the application, the signals 00 and 11 might be reduced to one signal, giving a total of 3 signal cases for the exposure control in those applications. In the cases 01 and 10, brightness processor 210 and darkness processor 212 are respectively enabled. Each of these processors evaluates the function $$Y = \frac{\ln[D,L/255]}{\ln[I_{dark},I_{light}/255]} \quad (12)$$

where D,L is either the dark threshold $T_{dark}$ or light threshold level $T_{light}$; and $I_{dark}$, $I_{light}$ is the dark or light intensity value, dependent on the actual case 01 and 10.

In one possible embodiment, as shown in FIG. 8 of the calculation of response 01, i.e. the image appears too light, since for a system, $T_{dark}$ and C are constants, a pair of look-up tables can be used, indexed by value $I_{dark}$, with reasonably efficient results since there are only 256 values for $I_{light}$ or $I_{dark}$. Thus, in FIG. 8, signal H(I) is processed with rain detector 250 for the 100% range, which produces a signal $I_{dark100}$ as an address to look-up table (LUT) 252, which is loaded with precalculated values for $\gamma$. Alternatively, there are many circuit arrangements for evaluating the equation.

A convenient way to evaluate response 10, i.e. the image is too dark, is to invert the image by subtracting every density level from 255 (or as in FIG. 9, add (−255)) at signal adder 280 and process the image in the same way as case 01, with min detector 282, which produces a signal $I_{dark100}$ as an address to look-up table (LUT) 284, which is loaded with precalculated values for $\gamma$. The result of this operation is that a $\gamma > 1$ is calculated for images that are too dark, however, this $\gamma$ is applied to the inverted data. The advantage of this embodiment is that images that are too light and images that are too dark are treated in a symmetrical manner.

Even though we have inverted the input intensity values in the implementation depicted in FIG. 9 values $T_{dark}$ and $T_{light}$ may be different. If they are not, the same look up tables could be used. It will no doubt be recognized that the look-up tables could be stored in RAM or ROM memory or in other electronic storage devices including floppy disc, etc.

The output of look-up tables 252 and 284 is the value $\gamma$, which is then used to adjust the TRC mapping arrangement. Typically, a tone reproduction correction generator for providing tone reproduction control adjusts TRC by providing a look-up table of corrected responses, addressed by the uncorrected responses. The exponential function defined by $\gamma$ can be applied to each corrected response to obtain the exposure corrected response. The TRC function determined can be applied then to either the luminance value of the images defined in luminance/chrominance space, which produces acceptable results. Additionally, however, the same TRC curve can be applied to each of the red, green and blue image components of the image as originally defined. This appears to produce somewhat better results.

With reference again to FIG. 6, to assure that the results do not rely on image aberrations at the ends of the dynamic range, the same operation may be used for the middle 90% of the data, or some other percentage of the data, which tends to assure that the data operated on actually represents the image or picture. The same or different threshold $T_{light}$ or $T_{dark}$ may be used. H(I)90 is processed otherwise identically, yielding the measured dark and light input intensity values $I_{dark90}$ and $I_{light90}$. Subsequent to processing H(I)90 and H(I)100, the resultant $\gamma_{100}$ and $\gamma_{90}$ are checked for validity. Different validity checks are made. The first validity check compares both $\gamma_{100}$ and $\gamma_{90}$ to pre-specified $\gamma$ ranges. It has been found that the range of 0.5–2.0 is a range giving good results. Additionally, the discrepancy or agreement between the $\gamma_{100}$ and $\gamma_{90}$ values is determined. For the preferred embodiment, where the cases 01 and 10 are treated as inverted cases, yielding a $\gamma > 1$, the $\gamma$ values are considered to be in agreement if they are within a preset range of about 0.5, i.e.: $\gamma_{90} - \gamma_{100} \leq 0.5$. If the values are in agreement they are averaged. If not, the $\gamma_{90}$ value is discarded.

FIGS. 10 and 11 show a flow chart of the inventive process at step 300, r, g, b data is received. At step 302, the r, g, b data is converted to YES values. At step 304, histogram signal H(I) is derived from the Y signal. At steps 306 and 308 the process branches into processing the 100% range and the 90% range of H(I). Between steps 308, 310 and 312 the maximum value of H(I), $I_{light100}$, and the minimum value of H(I), $I_{dark100}$, is compared respectively to threshold $T_{light}$ and $T_{dark}$ to determine whether to continue processing the image. Depending on the response, (noting the "yes" response of step 312 and the "no" response of step 310 that end the process) a value for $\gamma$ is derived by evaluating equation 12 at steps 322 for the case of the image being too light, and 320 for the case of the image being too dark. At step 324 the preliminary values for $\gamma_{100}$ and $\gamma_{90}$ are compared to find a disagreement, where a disagreement is reached when the difference between $\gamma_{90}$ and $\gamma_{100}$ is larger than a preset value $\Delta\gamma$, where a $\Delta\gamma$ value of 0.5 has been found to give good results in the embodiment outlined in FIGS. 10 and 11. If a disagreement is detected, the $\gamma_{90}$ value is ignored and only the $\gamma_{100}$ value is used for further processing. At step 326, the $\gamma_{100}$ value is compared to a preset range, in this case $\gamma_{100} \leq 2$ has been found to give good results. It should be noted, that an implementation that does not determine case 01 as an inversion from case 10 would have a $\gamma_{100}$ comparison with a range number <1. At step 326, if the $\gamma_{100}$ value is outside the predetermined range, it is brought into the range. At step 328 in case of a "NO" decision at block 324 the final $\gamma$ is calculated as a weighted sum of the $\gamma_{90}$ and $\gamma_{100}$ values, where equal weighting was used for simplicity. In case of a "YES" decision at step 324, the final $\gamma$ is determined at step 330 as being $\gamma_{100}$. At step 332, the TRC is generated that allows the mapping of the input intensity value to the corresponding output intensity value. Steps 324 to 330 are accordingly implemented for images that are too dark, case 10, with the difference that the resultant TRC representing a $\gamma$ value larger 1 has to be inverted at step 336 to yield the final TRC that is applied to the input image intensity.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method for reproducing a natural scene image from electronically-encoded signals, while altering the exposure therein, comprising the steps of:
   a) receiving an original electronically encoded natural scene image, where the encoding is in terms of color density signals;
   b) converting the color density signals to a format wherein at least one signal represents image intensity and is defined for L levels of intensity;
   c) comparing the intensity signal to a pair of preset threshold signals $T_{light}$, $T_{dark}$, respectively indicating satisfactory lightness and darkness of the image and generating a multi state signal responsive to the comparison;
   d) storing the color density signals to an output buffer if the signal state indicates that the intensity signal has light or dark values exceeding both threshold signals or neither threshold signals $T_{light}$, $T_{dark}$, thereby directing the electronically encoded image to a destination reproduction device without exposure alteration;
   e) responsive to a signal state indicating that the intensity signal has dark or light values exceeding one of threshold signals $T_{light}$, $T_{dark}$, evaluating the function:

$$\text{OutputI} = \text{InputI}^\gamma$$

where I is image intensity at a given discrete area of the image and $\gamma$ is given as $$\frac{\ln[(T_{light}, T_{dark})/L]}{\ln[(I_{light}, I_{dark})/L]}$$

f) adjusting the tone reproduction characteristics of the destination reproduction device by the exponential function $\gamma$ for printing portions of the received electronically encoded signals in which the intensity signal has dark or light values exceeding one of threshold signals $T_{light}$, $T_{dark}$.

2. The method as defined in claim 1, wherein each original color density signal, is defined in terms of red-green blue color space.

3. The method as defined in claim 2, wherein color density signals defined in terms of red-green-blue color space are converted to luminance-chrominance space, and the signal describing intensity of the image is the luminance signal.

4. The method as defined in claim 1, including the initial step of sampling the electronically encoded signals at a resolution less than the resolution of the thereof.

5. The method as defined in claim 1, wherein prior to adjusting the tone reproduction characteristics of a destination reproduction device by the exponential function $\gamma$, the value of $\gamma$ is checked for validity, and if $\gamma$ is an invalid value, a closest valid value of $\gamma$ is substitute therefore.

6. The method as defined in claim 1, wherein the step of evaluating the function $$\frac{\ln[(T_{light}, T_{dark})/L]}{\ln[(I_{light}, I_{dark})/L]}$$

using the value of $I_{light}$, $I_{dark}$ as an address to an addressable memory to retrieve a stored value of $\gamma$.

7. An image processing system for preparing a color image for printing, and including an exposure adjustment system altering the exposure in the reproduction of an electronically encoded natural scene image, comprising:
   a) a memory receiving and storing an electronically encoded natural scene image, where the encoding is in terms of color density signals;
   b) a color space conversion circuit, converting the color density signals to an image intensity signal format, wherein at least one signal represents image intensity I and is defined for L levels of intensity;

c) a thresholding circuit, receiving as inputs a pair of preset threshold signals $T_{light}$, $T_{dark}$, and the intensity signals, and providing at least a multi state output signal respectively indicating satisfactory brightness and darkness of the image;

d) a logic controller, responsive to the state signal, and controlling transfer of the electronically encoded natural scene image directly to a subsequent image processing element if the signal state indicates that the intensity signal has dark or light values exceeding both threshold signals $T_{light}$, $T_{dark}$ or neither threshold signals $T_{light}$, $T_{dark}$ and responsive to a signal state indicating that the signal state indicates that the intensity signals has light or dark values exceeding one of threshold signals $T_{light}$, $T_{dark}$ generating an evaluation signal;

e) a $\gamma$ calculating circuit evaluating:

$$Y = \frac{\ln[(T_{light}, T_{dark})/L]}{\ln[(I_{light}, I_{dark})/L]}$$

f) means for adjusting the tone reproduction characteristics of a destination reproduction device by the exponential function $\gamma$.

8. The system as defined in claim 7, wherein each original electronic signal is defined in terms of red-green blue color space.

9. The system as defined in claim 8, wherein each original electronic signal is defined in terms of red-green-blue color space is converted to luminance-chrominance space, and the signal describing intensity of the image is the luminance signal.

10. The system as defined in claim 7, including the undersampling of the color density signals.

11. The system as defined in claim 7, and further comprising:

a comparator having as an input the value of $\gamma$, and range of valid values for $\gamma$ and generating an invalid signal when $\gamma$ is outside the valid value range; and a device validity memory, storing substitute values, and returning to the tone reproduction characteristic adjusting means a substitute value of $\gamma$ upon receiving an invalid signal.

12. The system as defined in claim 7 wherein the $\gamma$ evaluating circuit includes a device memory, operative in response to the evaluation signals, and receiving as an address the dark or light intensity values and returning from the address location in memory a stored value of $\gamma$.

13. A method for reproducing a natural scene image from electronically encoded signals, while altering the exposure, comprising the steps of:

a) receiving signals for an electronically encoded natural scene image, where the encoding is in terms of red-green-blue color density signals;

b) converting the color density signals to a luminance-chrominance signal format, wherein at least one signal represents image intensity I;

c) comparing the intensity signal to a pair of preset threshold signals $T_{light}$, $T_{dark}$, respectively indicating satisfactory brightness and darkness of the image and generating a multi state signal responsive to the comparison;

d) storing the signals to an output buffer if the signal state indicates that the intensity signal has dark and light values exceeding both threshold signals $T_{light}$, $T_{dark}$, or neither threshold signals $T_{light}$, $T_{dark}$; thereby directing the electronically encoded image to a destination printer without exposure alteration;

e) responsive to a signal state indicating that one of the pair of preset thresholds $T_{light}$, $T_{dark}$ is exceeded, using the value of $I_{light}$, $I_{dark}$ as an address to device memory to retrieve a stored value of $\gamma$ for the predetermined function of $$\frac{\ln[(T_{light}, T_{dark})/L]}{\ln[(I_{light}, I_{dark})/L]}$$

f) adjusting the tone reproduction characteristics of the destination reproduction device by an exponential function defined by the retrieved value $\gamma$ for printing portions of the electronically encoded intensity signals representing the natural scene image, in which the intensity signal has dark or light values exceeding one of threshold signals $T_{light}$, $T_{dark}$.

14. The method as defined in claim 13, wherein prior to adjusting the tone reproduction characteristics of a destination reproduction device by the exponential function $\gamma$, the value of $\gamma$ is checked for validity, and if $\gamma$ is an invalid value, a closest valid value is substitute therefor.

15. The method as defined in claim 13, including the initial step of sampling the electronically encoded intensity signals at a resolution less than the resolution thereof.

16. An image processing system for preparing a color image for printing, and including an exposure adjustment system altering the exposure in the reproduction of an electronically encoded natural scene image, comprising:

a) a page buffer memory receiving and storing an electronically encoded natural scene image, where the encoding is in terms of red-green-blue color density signals;

b) a color space conversion circuit, converting the color density signals to a luminance-chrominance signal format, wherein at least one signal represents image intensity I;

c) a thresholding circuit, receiving as inputs a pair of preset threshold signals $T_{light}$, $T_{dark}$, and the intensity signals I, and providing a four state output signal respectively indicating satisfactory brightness and darkness of the image;

d) a logic controller, responsive to the four state signal, and controlling transfer of the electronically encoded natural scene image directly to a subsequent image processing element if the signal state indicates that the intensity signal has dark or light values exceeding both threshold signals $T_{light}$, $T_{dark}$ or neither threshold signals $T_{light}$, $T_{dark}$ and responsive to a signal state indicating the intensity signal I has dark or light values exceeding one of threshold signals $T_{light}$, $T_{dark}$ generating an evaluation signal;

e) a device memory, operative in response to the evaluation signals, and receiving as an address the dark or light intensity values and returning from the address location in memory a stored value of $\gamma$ for the predetermined function of $$Y = \frac{\ln[(T_{light}, T_{dark})/L]}{\ln[(I_{light}, I_{dark})/L]}$$

f) tone reproduction correction generator adapted for communication with a destination reproduction device to vary the toner reproduction response thereof by the exponential curve defined by the retrieved value $\gamma$.

17. The system as defined in claim 16, and further comprising:

a comparator having as an input the value of $\gamma$, and range of valid values for $\gamma$ and generating an invalid signal when $\gamma$ is outside the valid value range; and a device validity memory, storing substitute values, and returning to the toner reproduction characteristic adjusting means a substitute value of $\gamma$ upon receiving an invalid signal.

18. The method as defined in claim 16, including the initial step of sampling the electronic signals at a resolution less than the resolution of the electronic signals.

19. A method for reproducing a natural scene image from electronically encoded intensity signals, while altering the exposure, comprising the steps of:

a) receiving an electronically encoded natural scene image, where the encoding is in terms of red-green-blue color density signals;

b) converting the color density signals to an L level luminance-chrominance signal format, wherein at least one signal represents image intensity I;

c) comparing the intensity signal to a pair of preset threshold signals $T_{light}$, $T_{dark}$, respectively indicating satisfactory brightness and darkness of the image and generating a four state signal responsive to the comparison;

d) storing the signals to an output buffer if the signal state indicates that the intensity signal has dark or light values exceeding both threshold signals $T_{light}$, $T_{dark}$ or neither threshold signals $T_{light}$, $T_{dark}$ thereby directing the electronically encoded image to a destination reproduction device without exposure alteration;

e) responsive to a signal state indicating that the intensity signal has dark or light values exceeding one of threshold signals $T_{dark}$, $T_{light}$, evaluating $$Y = \frac{\ln[(T_{light}, T_{dark})/L]}{\ln[(I_{light}, I_{dark})/L]}$$

f) repeating steps c), d) and e) for intensity signal I, subtracting those portions of the signal in preselected outer bands of intensity to derive a signal I' and using threshold signals $T'_{dark}$, $T'_{light}$ to obtain $\gamma'$;

g) averaging $\gamma$ and $\gamma'$ to obtain $\gamma_{ave}$;

h) adjusting the tone reproduction characteristics of a destination reproduction device by the exponential function $\gamma_{ave}$ for printing portions of electronically encoded intensity signals in which the intensity signal has dark or light values exceeding one of threshold signals $T_{light}$, $T_{dark}$.

20. The method as defined in claim 19, wherein prior to adjusting the tone reproduction characteristics of a destination reproduction device by the exponential function $\gamma_{ave}$, the value of $\gamma$ is checked for validity, and if $\gamma$ is an invalid value, $\gamma_{ave}$ is set equal to $\gamma'$.

21. The method as defined in claim 19, wherein prior to adjusting the tone reproduction characteristics of a destination reproduction device by the exponential function $\gamma_{ave}$, the value of $\gamma'$ is checked for validity, and if $\gamma'$ is an invalid value, $\gamma_{ave}$ is set equal to $\gamma$.

22. The method as defined in claim 19, wherein prior to adjusting the tone reproduction characteristics of a destination reproduction device by the exponential function $\gamma_{ave}$, the value of $\gamma'$ and $\gamma$ is checked for validity, and if $\gamma'$nd $\gamma$ are invalid value, $\gamma_{ave}$ is set equal to a closest valid value of $\gamma$.

23. The method as defined in claim 19, including the initial step of sampling the electronically encoded intensity signals at a resolution less than the resolution thereof.

24. The method as defined in claim 19, wherein the electronically encoded natural scene image is received at a page buffer memory.

25. An image processing system for preparing a color image for printing, and including an exposure adjustment system altering the exposure in the reproduction of an electronically encoded natural scene image, comprising:

a) a system input receiving an electronically encoded natural scene image, where the encoding is in terms of red-green-blue color density signals;

b) a color space conversion circuit, converting the color density signals to an L level luminance-chrominance signal format, wherein at least one signal represents image intensity I;

c) a thresholding circuit, receiving as inputs a pair of preset threshold signals $T_{light}$, $T_{dark}$, and the intensity signals I, and providing a four state output signal respectively indicating satisfactory brightness and darkness of the image;

d) a logic controller, responsive to the four state signal, and controlling transfer of the electronically encoded natural scene image directly to a subsequent image processing element if the signal state indicates that the intensity signal has dark or light values exceeding both threshold signals $T_{dark}$, $T_{light}$ or neither threshold signals $T_{dark}$, $T_{light}$ and responsive to a signal state indicating that the signal state indicates that the intensity signals has dark or light values exceeding one of threshold signals $T_{dark}$, $T_{light}$ generating an evaluation signal;

e) a $\gamma$ calculating circuit evaluating:

$$Y = \frac{\ln[(T_{light}, T_{dark})/L]}{\ln[(I_{light}, I_{dark})/L]};$$

f) a thresholding circuit, receiving as inputs a pair of preset threshold signals $T_{light}$, $T_{dark}$, and the intensity signals, subtracting those portions of the intensity signal in preselected outer bands of intensity, and providing a four state output signal respectively indicating satisfactory brightness and darkness of the image;

g) a logic controller, responsive to the four state signal, and controlling transfer of the electronically encoded natural scene image directly to a subsequent image processing element if the signal state indicates that the intensity signal has dark or light values exceeding both threshold signals $T'_{dark}$, $T'_{light}$ or neither threshold signals $T'_{dark}$, $T'_{light}$ and responsive to a signal state indicating that the signal state indicates that the intensity signals has dark or light values exceeding one of threshold signals $T'_{dark}$, $T'_{light}$ generating an evaluation signal;

h) a $\gamma'$ calculating circuit evaluating:

$$Y' = \frac{\ln[(T_{light}', T_{dark}')/L]}{\ln[(I_{light}', I_{dark}')/L]}$$

i) an averaging circuit for averaging $\gamma'$ and $\gamma$ to obtain $\gamma_{ave}$;

j) a destination reproduction device having a tone reproduction relating input signals to output response thereof, and responsive to the averaging circuit to vary the output response by the exponential function $\gamma_{ave}$.

26. The system as defined in claim 25, and further comprising:

a comparator having as an input the value of $\gamma$, and range of valid values for $\gamma$ and generating an invalid signal when $\gamma$ is outside the valid value range; and a device validity memory, storing substitute values, and returning to the toner reproduction characteristic adjusting means a substitute value of $\gamma$ upon receiving an invalid signal.

27. A color reproduction system acquiring and printing a color image, and including an exposure adjustment circuit altering the exposure in the reproduction of an natural scene image, comprising:

a) a scanner suitable for generating a digitally encoded natural scene image from an original scene, in terms of color density signals;

b) a multicolor printer, responsive to signals directed thereto to print an image, and provided with a tone reproduction control relating input signals to printer response;

c) a color space conversion circuit, converting the color density signals to an L level luminance-chrominance signal format, wherein at least one signal represents image intensity I;

d) an exposure adjustment circuit including i) a thresholding circuit, receiving as inputs a pair of preset threshold signals $T_{light}$, $T_{dark}$, and the intensity signals I, and providing a multi state output signal respectively indicating satisfactory brightness and darkness of the image;

ii) a logic controller, responsive to the multi state signal, and controlling transfer of the electronically encoded natural scene image directly to a subsequent image processing element if the signal state indicates that the intensity signal has dark or light values exceeding both of threshold signals $T_{light}$, $T_{dark}$, or neither of threshold signals $T_{light}$, $T_{dark}$, and responsive to a signal state indicating that the intensity signals has dark or light values exceeding one of threshold signals $T_{light}$, $T_{dark}$, to generate an evaluation signal;

iii) a $\gamma$ calculating circuit, responsive to the evaluation signals to evaluate the function:

$$Y = \frac{\ln[(T_{light}, T_{dark})/L]}{\ln[(I_{light}, I_{dark})/L]}$$

e) said toner reproduction control responsive to said calculated $\gamma$ to correct the printer response to the a digitally encoded natural scene image as an exponential function of $\gamma$.

* * * * *